(12) United States Patent
Xia et al.

(10) Patent No.: US 10,197,851 B2
(45) Date of Patent: Feb. 5, 2019

(54) BACKLIGHT MODULE AND METHOD FOR ASSEMBLING THE SAME, AND DISPLAY DEVICE

(71) Applicants: BOE TECHNOLOGY GROUP CO., LTD., Beijing (CN); HEFEI BOE DISPLAY LIGHTING CO., LTD., Hefei, Anhui (CN)

(72) Inventors: Jitai Xia, Beijing (CN); Wenbo Sun, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 0 days.

(21) Appl. No.: 15/560,072

(22) PCT Filed: Feb. 8, 2017

(86) PCT No.: PCT/CN2017/073085
§ 371 (c)(1),
(2) Date: Sep. 20, 2017

(87) PCT Pub. No.: WO2017/193655
PCT Pub. Date: Nov. 16, 2017

(65) Prior Publication Data
US 2018/0188607 A1    Jul. 5, 2018

(30) Foreign Application Priority Data
May 10, 2016  (CN) .......................... 2016 1 0303503

(51) Int. Cl.
*G09F 13/04* (2006.01)
*G02F 1/1335* (2006.01)

(52) U.S. Cl.
CPC .. *G02F 1/133608* (2013.01); *G02F 1/133603* (2013.01); *G02F 2201/465* (2013.01)

(58) Field of Classification Search
CPC .................................. G09F 13/04; G09F 13/08
(Continued)

(56) References Cited

U.S. PATENT DOCUMENTS

2016/0070056 A1* 3/2016 He ....................... G02B 6/0023
                                                                349/65
2016/0195662 A1* 7/2016 Ma ........................ G02B 6/009
                                                               362/382

FOREIGN PATENT DOCUMENTS

CN        201041605 Y      3/2008
CN        201083924 Y      7/2008
(Continued)

OTHER PUBLICATIONS

English translation of PCT International Search Report, Application No. PCT/CN2017/073085, dated May 4, 2017, 3 pages.
(Continued)

*Primary Examiner* — Edwyn Labaze
(74) *Attorney, Agent, or Firm* — Armstrong Teasdale LLP

(57) ABSTRACT

The present disclosure discloses a backlight module and a method for assembling the same, and a display device. The backlight module includes a backplate and a light strip, wherein, on the backplate is provided a fixing structure, the fixing structure including a resilient press tab provided with a protrusion thereon projecting toward the surface of the backplate, and on the light strip is provided a hole which can be matched with the protrusion on the resilient press tab.

16 Claims, 7 Drawing Sheets

(58) Field of Classification Search
USPC .............................................. 362/97.1, 97.2
See application file for complete search history.

(56) References Cited

FOREIGN PATENT DOCUMENTS

| CN | 203176948 U | 9/2013 |
|---|---|---|
| CN | 203249185 U | 10/2013 |
| CN | 203298070 U | 11/2013 |
| CN | 103423713 A | 12/2013 |
| CN | 204829538 U | 12/2015 |
| CN | 105807490 A | 7/2016 |
| KR | 100623325 B1 | 9/2006 |

OTHER PUBLICATIONS

PCT Written Opinion, Application No. PCT/CN2017/073085, dated May 4, 2017, 7 pages.: with English translation of relevant part.
China First Office Action, Application No. 201610303503.5, dated Dec. 29, 2017, 17 pps.: with English translation.

\* cited by examiner

US 10,197,851 B2

BACKLIGHT MODULE AND METHOD FOR ASSEMBLING THE SAME, AND DISPLAY DEVICE

CROSS REFERENCE TO RELATED APPLICATIONS

This patent application is a National Stage Entry of PCT/CN2017/073085 filed on Feb. 8, 2017, which claims the benefit and priority of Chinese Patent Application No. 201610303503.5 filed on May 10, 2016, the disclosures of which are incorporated herein by reference in their entirety as part of the present application.

BACKGROUND

Embodiments of the present disclosure relate to the field of displays, and more particularly to a backlight module and a method for assembling the same, and a display device.

An LCD TV mainly includes a liquid crystal display, a control panel and other components, and the liquid crystal display mainly includes an LCD panel and a backlight module. Backlight types can be divided into edge-lit backlights and direct-lit backlights. In recent years, in order to reduce the cost of an LCD TV, direct-lit backlights are used by more manufacturers. Compared with edge-lit backlights, the cost advantage of direct-lit backlights is very obvious.

The direct-lit backlight module includes a light strip and a backplate. At present, the light strip and the backplate of the direct-lit backlight module are usually fixed in the following three ways: the first way is to stick using a double-sided stick tape, as shown in FIG. 1, the second fixing way is to attach using a screw, as shown in FIG. 2, the third fixing way is using resilient fitting on the shorter side, as shown in FIG. 3. Some problems have been reported for these three fixing ways in the current production, which are difficult to be fundamentally solved. For the first fixing way using the double-sided stick tape, when in re-work, residue adhesive is prone to remain, and the light strip will be deformed. For the second fixing way using the screw, the cost of working hours is high, and iron dust is prone to appear when using the screw to fix. For the third fixing way using the shorter-side resilient fitting, after the light strip and the backplate are fitted together, when in re-work, auxiliary tools will have to be used, and the light strip is easily to be deformed, so it is seldom used in the industry.

It will be appreciated that there is a need in the art for an improved backlight module solution that overcomes the shortcomings of the prior art described above.

BRIEF DESCRIPTION

One aspect of the present disclosure provides a backlight module, including a backplate and a light strip, wherein a fixing structure is provided on the backplate, the fixing structure including a resilient press tab provided with a protrusion thereon projection toward the surface of the backplate, and in the light strip is provided a hole capable of matching with the protrusion on the resilient press tab.

Another aspect of the present disclosure provides a backlight module, including a backplate and a light strip, wherein a fixing structure is provided on the backplate, the fixing structure including a resilient press tab provided with a hole thereon, and on the light strip is provided a protrusion which can be matched with the hole in the resilient press tab.

Another aspect of the present disclosure provides a display device, including a display panel, and a backlight module according to an embodiment of the present disclosure.

Another aspect of the present disclosure provides a method for assembling a backlight module, including preparing a backplate, including providing a fixing structure on the backplate, the fixing structure including a resilient press tab provided with a protrusion thereon projecting toward the surface of the backplate, preparing a light strip, including providing a hole in the light strip capable of matching with the protrusion on the resilient press tab, and after the hole in the light strip and the protrusion on the resilient tab of the fixing structure of the backplate is aligned in the direction of the length of the light strip, bringing the light strip and the backplate closer and closer to each other, until the protrusion is engaged with the hole so as to assemble the light strip and the backplate.

DETAILED DESCRIPTION

The technical solution of the present disclosure provides an effective fixing method for the light strip and the backplate, and has the advantages of simple structure, convenient assembling, convenient re-work, low material and labor cost, overcoming deformation of the light strip, material waste, assembly and re-work inconvenience, high labor costs and other shortcomings of the prior art.

In order to provide a better understanding of the solution of the present disclosure to those skilled in the art, a backlight module and a method for assembling the same, and a display device according to embodiments of the present disclosure will now be described in greater detail with reference to the accompanying drawings and specific embodiments of the present disclosure. It is obvious that the described embodiments are part of the present application, not all embodiments. All other embodiments obtained based on the described embodiments of the present disclosure by one of ordinary skill in the art without the need for creative work are within the scope of this disclosure.

Figure 3:
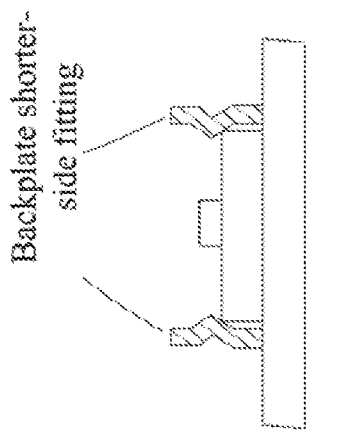
FIG. 3 shows an existing fixing way of a light strip and a backplate using a shorter-side resilient fitting.
Figure 2:
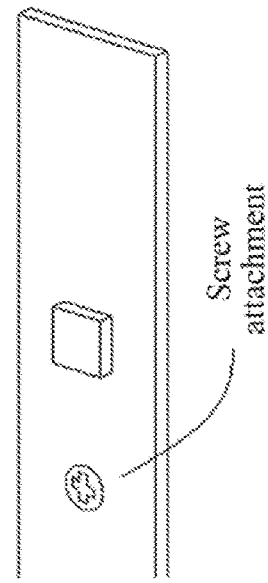
FIG. 2 shows an existing fixing way of a light strip and a backplate using a screw to attach.
Figure 1:
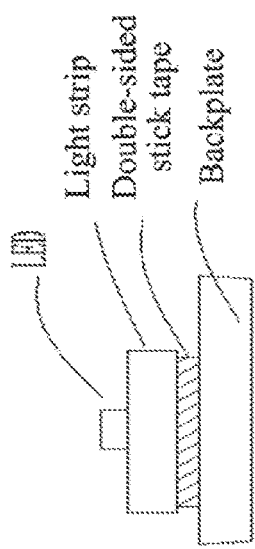
FIG. 1 shows an existing fixing way of a light strip and a backplate using a double-sided stick tape to attach.
Figure 4:
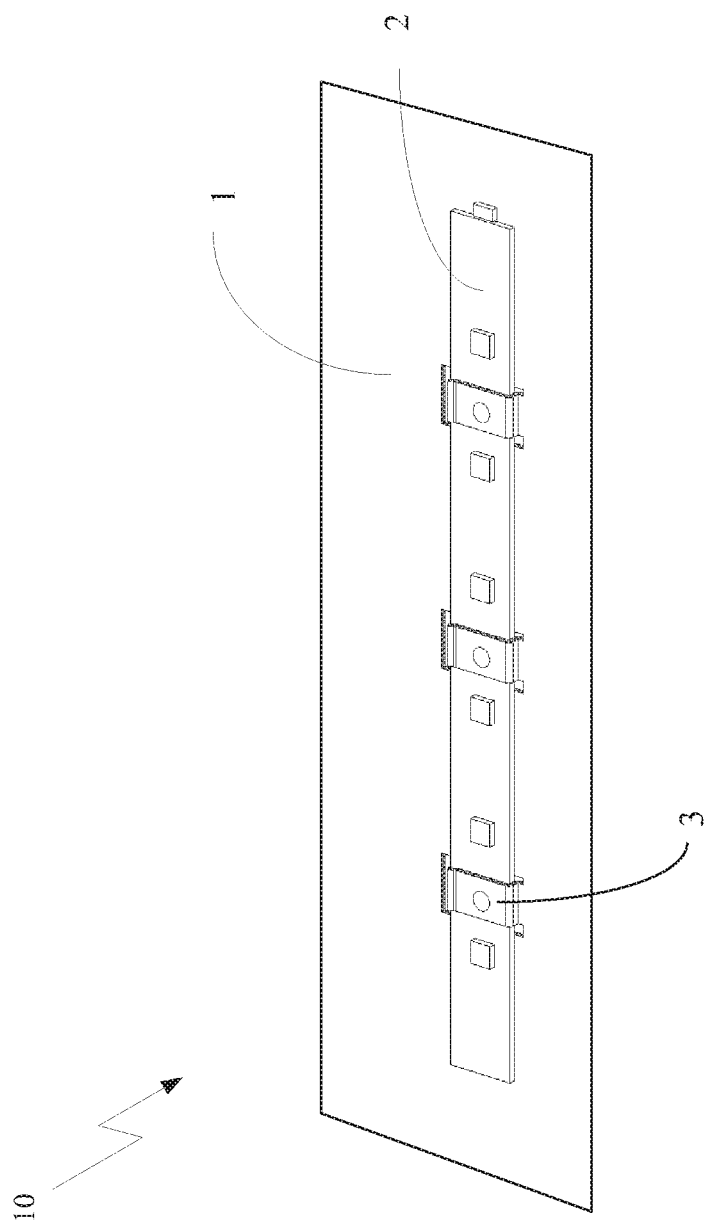
FIG. 4 shows a schematic diagram of a backlight module according to an embodiment of the present disclosure.

Referring now to FIG. 4, there is shown a schematic view of a backlight module 10 according to an embodiment of the present disclosure. The backlight module 10 may be, for example, a backlight module for a liquid crystal display (LCD), and may be, for example, a direct-lit backlight module. As shown in the drawing, the backlight module 10 includes a backplate 1 and a light strip 2. The backplate 1 is provided with a fixing structure 3 thereon. The fixing structure 3 may be a plurality of fixing structures 3. For example, the fixing structure 3 may include a plurality of rows of fixing structures 3, each row of fixing structures may include at least two fixing structures 3, and each row of fixing structures 3 may, for example, be configured to hold a light strip 2. Although only one light strip 2 is shown in FIG. 4, it will be apparent to those skilled in the art that a plurality of light strips 2 can be fixed on the backplate 1.

Figure 5A:
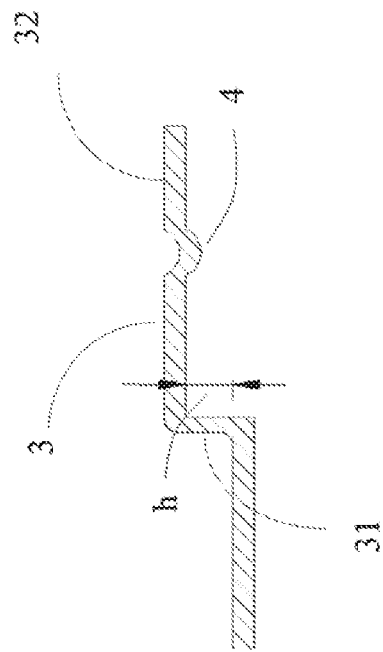
FIG. 5A schematically shows a partial view of a fixing structure on a backplate according to an exemplary embodiment of the present disclosure.
Figure 5B:
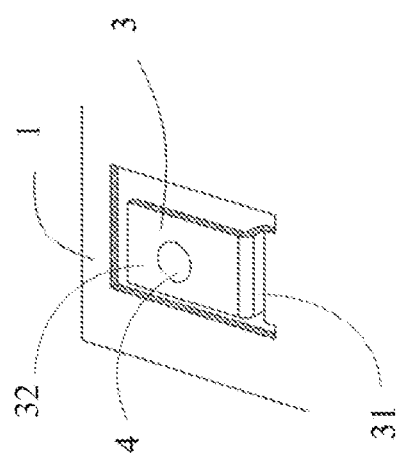
FIG. 5B schematically shows a partial cross-sectional view of a fixing structure according to an exemplary embodiment of the present disclosure.

Referring now to FIGS. 5A and 5B, FIG. 5A schematically shows a partial view of a fixing structure 3 on a backplate 1 according to an exemplary embodiment of the present disclosure, and FIG. 5B schematically shows a partial cross-sectional view of a fixing structure 3 according to an exemplary embodiment of the present disclosure.

Optionally, the fixing structure 3 may be formed by pressing on the backplate 1. Accordingly, the fixing structure 3 includes a root portion 31 connected to the backplate and a press tab 32 having one end connected to the root portion 31 and the other end being a free end.

Optionally, the press tab 32 is substantially parallel to the surface of the backplate 1. Further optionally, the height h of the lower surface of the press tab 32 from the upper surface of the backplate 1 is slightly greater than or equal to the thickness of the light strip 2 so as to fix the light strip 2 under the press tab 32.

Since the backplate 1 is a sheet metal material, the press tab 32 of the fixing structure 3 will have a certain resilience in the up-and-down direction, and the light strip 2 can be fixed to the backplate 1 by means of the resilience.

Optionally, a protrusion 4 is provided on the press tab 32, which protrusion 4 protrudes toward the backplate 1. Optionally, the protrusion 4 is formed by pressing on the press tab 32. The tip end of the protrusion 4 may be smaller in size than its root. The protrusion 4 may be, for example, hemispherical (or partially hemispherical), conical, and/or truncated conical. The protrusions may also be of other shapes, such as a conical or truncated conical shape with an oval or other closed shaped section.

The protrusion 4 provided on the press tab 32 is configured to match with a hole (as described below) provided on the light strip 2 in order to position and limit the light strip 2. Optionally, the diameter (or size) of the root of the protrusion 4 is slightly larger than the diameter (or size) of the hole, and the diameter (or size) of the tip end of the protrusion 4 is slightly smaller than the diameter (or size) of the hole.

The degree of tightness of assembly of the fixing structure 3 and the light strip 2 can be adjusted by adjusting the position of the protrusion 4 on the resilient press tab 32. For example, generally the closer the protrusion 4 is to the root portion 31, the tighter the assembly of the fixing structure 3 and the light strip 2 is; and the closer the protrusion 4 is to the free end of the press tab 32, the looser the assembly of the fixing structure 3 and the light strip 2. In other words, the position of the protrusion 4 on the resilient press tab 32 depends on the required degree of tightness of assembly of the light strip 2 and the backplate 1, wherein the more the required degree of closeness of assembly of the light strip 2 and the backplate 1, the closer the protrusion 4 is to the root portion 31 of the fixing structure 3.

Figure 6B:
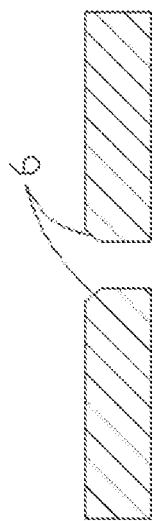
FIG. 6B schematically shows a partially enlarged cross-sectional view of a structure on a light strip corresponding to the fixing structure according to an exemplary embodiment of the present disclosure.
Figure 6A:
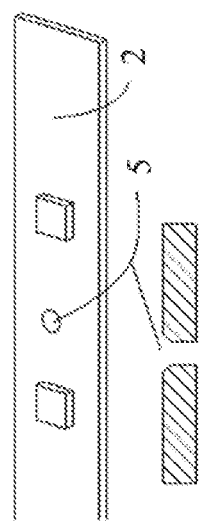
FIG. 6A schematically shows a light strip and a structure on the light strip corresponding to the fixing structure on the backplate according to an exemplary embodiment of the present disclosure.

Referring now to FIGS. 6A and 6B, FIG. 6A schematically shows a light strip 2 and a structure on the light strip 2 corresponding to the fixing structure 3 on the backplate 1 according to an exemplary embodiment of the present disclosure, 6B schematically shows a partially enlarged cross-sectional view of the structure on the light strip 2 corresponding to the fixing structure 3 according to an exemplary embodiment of the present disclosure. As shown in the drawing, a hole 5 is provided on the light strip 2 at a position corresponding to the fixing structure 3 on the backplate 1 (specifically, a position corresponding to the protrusion 4 on the fixing structure 3). The hole 5 may be, for example, a through hole. The diameter of the hole 5 may be slightly larger than the diameter of the tip end portion of the protrusion 4, but slightly smaller than the diameter of the root portion of the protrusion 4.

In this way, the light strip 2 can be fixed to the backplate 1 by the matching between the hole 5 in the light strip 2 and the protrusion 4 on the fixing structure 3 of the backplate 1.

Optionally, the hole 5 has a chamfer 6 on the side facing the protrusion 4, so that the assembly fitting between the protrusion 4 and the hole 5 can be facilitated.

Figure 7:
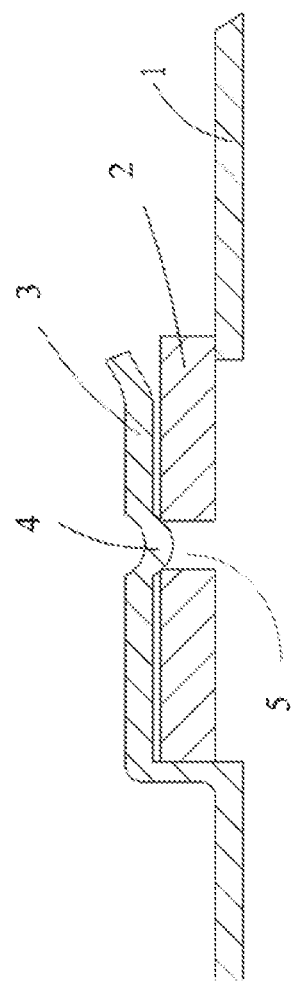
FIG. 7 shows a schematic cross-sectional view of a fixing structure on a backplate assembled with a light strip according to an exemplary embodiment of the present disclosure.

Referring now to FIG. 7, there is schematically shown a schematic cross-sectional view of a fixing structure 3 on a backplate 1 assembled together with a light strip 2 according to an exemplary embodiment of the present disclosure. As shown in the drawing, the projecting portion 4 on the fixing structure 3 of the backplate 1 is partially fitted into the hole 5 in the light strip 2, so as to realize the fixing and positioning of the light strip 2 in the three directions of X, Y, and Z.

Optionally, as further shown in FIG. 7, the free end of the press tab of the fixing structure 3 is slightly lifted, thereby facilitating the assembly of the light strip 2 and the fixing structure 3.

Optionally, the protrusion 4 or the like may also be considered to be provided on the light strip 2, and the hole 5 may be provided on the press tab of the fixing structure 3 of the backplate 1.

Figure 8A:
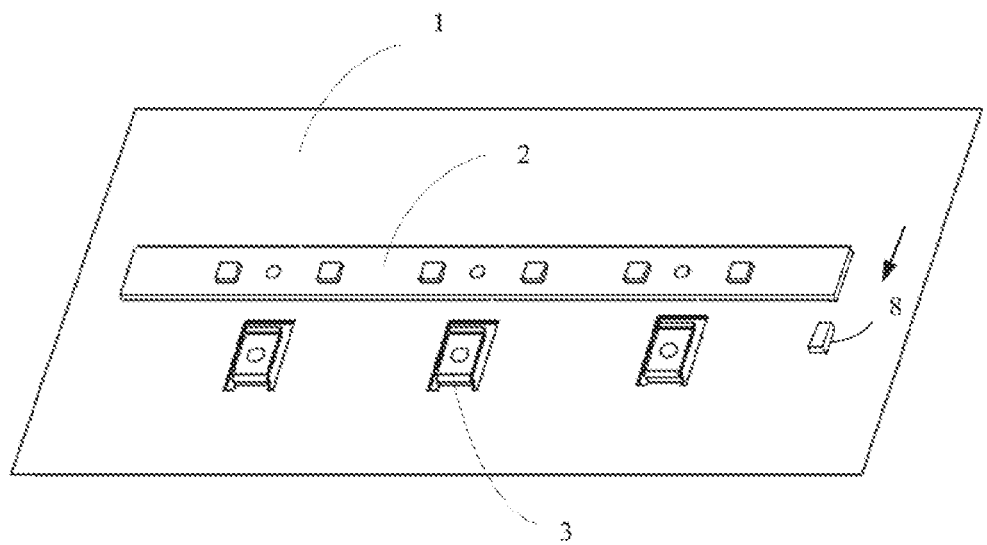
FIGS. 8A and 8B show a schematic diagram of a process of assembling a light strip onto a backplate.
Figure 8B:
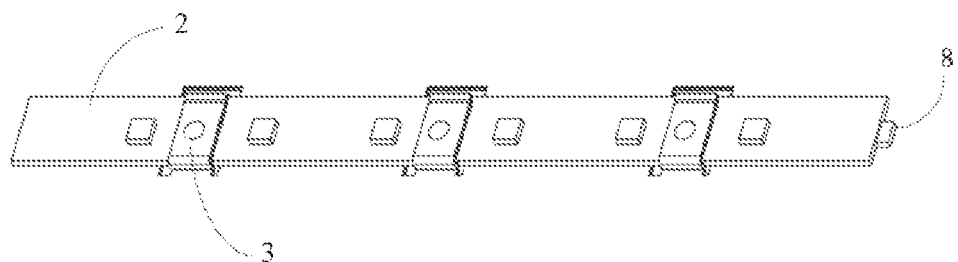

Referring now to FIGS. 8A and 8B, there is shown a schematic diagram of a process of assembling a light strip 2 into a backplate 1. As shown in the drawing, optionally, the backplate 1 is provided with a positioning stop wall 8 which is fixed to the backplate 1 and which is positioned so that when a side of the light strip 2 abuts against the stop wall, the respective holes 5 in the light strip 2 are aligned with the protrusions 4 on the corresponding fixing structures 3 along the direction of the length of the light strip. In this way, it is only necessary to bring the light strip 2 closer and closer toward the fixing structure 3 along the direction of its width (the direction indicated by the arrow in the figure), until the holes 3 in the light strip 2 are engaged with the protrusions 4 on the fixing structure 3, thus realizing the assembly of the light strip 2 and the backplate 1.

The backlight module according to embodiments of the present disclosure has been described above with reference to the accompanying drawings, and it is to be noted that the above description is by way of example only and is not intended to be limiting of the present disclosure. In other embodiments of the present disclosure, the backlight module may have more, fewer or different components, and the relationship of inclusion, connection, and functionality etc. among the components may be different from what has been described and illustrated. For example, the features included in the above exemplary embodiments may generally be combined with each other in a variety of ways known to those skilled in the art to form new embodiments.

Another aspect of the present disclosure also provides a display device including a display panel, and a backlight module as described above. Of course, as is known to those skilled in the art, the display device may also include other components, such as a drive circuit for driving the display panel, and the like. Since these other components can be existing components, so are not described repeatedly here.

Another aspect of the present disclosure also provides a method for assembling a backlight module. The method can be used to assemble the above-described backlight module according to embodiments of the present disclosure. For the sake of brevity, some details repeated with the above description are omitted in the following description, and therefore, a detailed understanding of the method can be obtained by referring to the above description.

Figure 9:
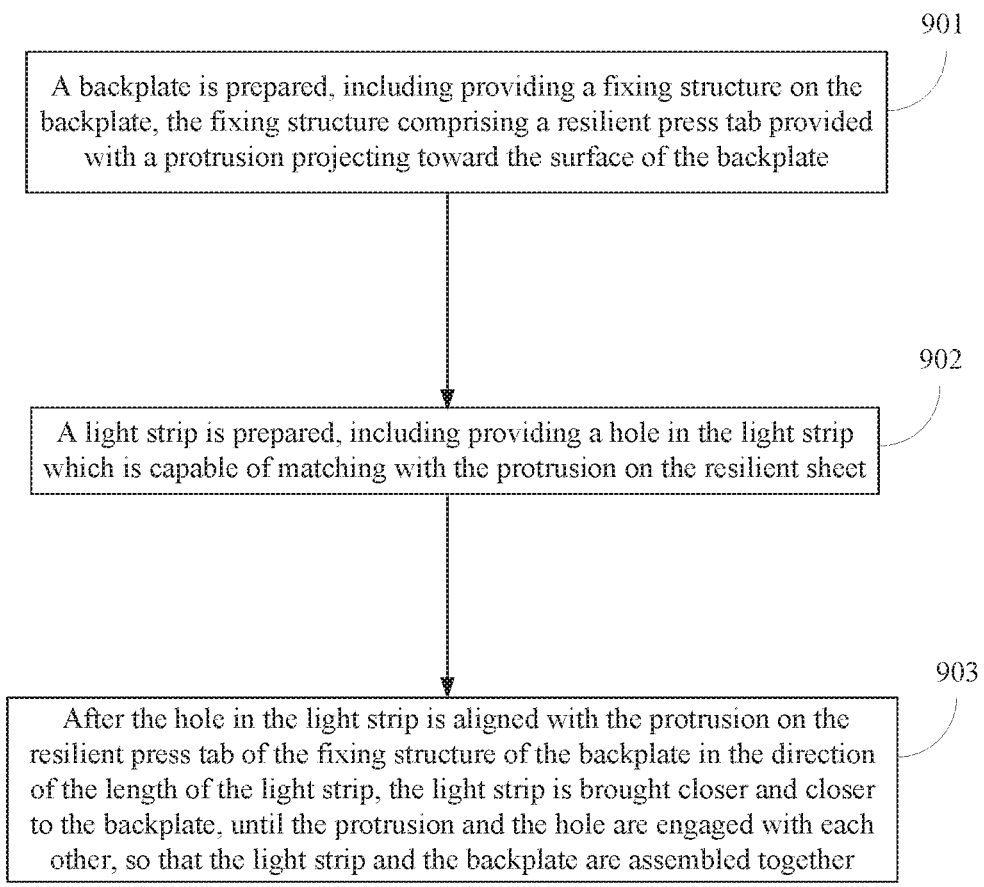
FIG. 9 shows a method for assembling a backlight module according to an embodiment of the present disclosure.

Referring now to FIG. 9, there is shown a method for assembling a backlight module according to an embodiment of the present disclosure. As shown in the figure, the method includes the following steps:

In step 901, a backplate is prepared, including providing a fixing structure on the backplate, the fixing structure including resilient press tab provided with a protrusion projecting toward the surface of the backplate;

In step 902, a light strip is prepared, including providing a hole in the light strip which is capable of matching with the protrusion on the resilient sheet;

In step 903, after the hole in the light strip is aligned with the protrusion on the resilient press tab of the fixing structure of the backplate in the direction of the length of the light strip, the light strip is brought closer and closer to the backplate, until the protrusion and the hole are engaged with each other, so that the light strip and the backplate are assembled together.

Optionally, the fixing structure includes at least one row of fixing structures, each row of fixing structures including at least two fixing structures, and each row of fixing structures for securing a light strip.

Optionally, preparing the backplate includes forming the fixing structure by pressing.

Optionally, preparing the backplate further includes providing a positioning stop wall on the backplate, and aligning the hole on the light strip with the protrusion on the resilient tab of the fixing structure of the backplate in the direction of the length of the light strip is achieved by abutting the light strip against the positioning stop wall.

The method for assembling a backlight module according to embodiments of the present disclosure has been described above with reference to the accompanying drawings, and it is to be noted that the above description is by way of example only and is not intended to be limiting of the present disclosure. In other embodiments of the present disclosure, the assembly method may have more, fewer, or different steps, and the relationship of order, inclusion, and functionality etc. among the steps may be different from what has been described and illustrated. For example, a plurality of steps may also be considered as a larger step, and a plurality of sub-steps included in one step may be considered as a plurality of separate steps. For another example, the order of the steps in the above description and illustrations in general does not constitute a limitation on the method of the present disclosure, and the steps may be performed in any order or concurrently as known to those skilled in the art. Also, for example, the features included in the above exemplary embodiments may generally be combined with each other in a variety of suitable ways as known to those skilled in the art to form new embodiments.

It is to be understood that the above embodiments of the present disclosure are merely exemplary embodiments for the purpose of illustrating the principles of the present disclosure, which is not limited thereto. It will be apparent to those skilled in the art that various changes and modifications can be made therein without departing from the spirit and spirit of the present disclosure, which changes and modifications are also intended to be within the scope of the present disclosure. The scope of the present disclosure is limited only by the meaning of the language expression of the appended claims and their equivalents.

What is claimed is:

1. A backlight module comprising:
    a backplate; and
    a light strip, wherein a fixing structure is provided on the backplate, the fixing structure comprising a resilient press tab that includes a protrusion projecting toward a surface of the backplate, and wherein the light strip includes a hole configured to engage the protrusion on the resilient press tab;
    wherein the fixing structure further comprises a root portion connected to the backplate, wherein one end of the resilient press tab is connected to the root portion and the other end of the resilient press tab is a free end; and
    wherein the resilient press tab is parallel to the surface of the backplate, and wherein a height of a lower surface of the resilient press tab from an upper surface of the backplate is slightly larger than or equal to a thickness of the light strip.

2. A backlight module according to claim 1, wherein the fixing structure comprises at least one row of fixing structures, each row of fixing structures comprising at least two fixing structures, and each row of fixing structures configured to secure a corresponding light strip.

3. A display device comprising:
    a display panel; and
    a backlight module according to claim 2.

4. A backlight module according to claim 1, wherein the fixing structure is formed by pressing.

5. A display device comprising:
    a display panel; and
    a backlight module according to claim 4.

6. The backlight module according to claim 1, wherein the protrusion is one of hemispherical, partially hemispherical, conical, and truncated conical.

7. A display device comprising:
    a display panel; and
    a backlight module according to claim 6.

8. The backlight module according to claim 1, wherein a diameter of a root portion of the protrusion is slightly larger than a diameter of the hole, and wherein a diameter of an end portion of the protrusion is slightly smaller than the diameter of the hole.

9. A display device comprising:
    a display panel; and
    a backlight module according to claim 8.

10. The backlight module according to claim 1, wherein a position of the protrusion on the resilient press tab is determined by a required tightness of the light strip and the backplate assembly, and wherein the greater the required tightness of the light strip and the backplate assembly, the closer the protrusion is to the root of the fixing structure.

11. A display device comprising:
a display panel; and
a backlight module according to claim 10.

12. The backlight module according to claim 1, wherein the hole is provided with a chamfer on a side facing the protrusion.

13. A display device comprising:
a display panel; and
a backlight module according to claim 12.

14. The backlight module according to claim 1, wherein a positioning stop wall is provided on the backplate, the positioning stop wall configured such that when the light strip abuts against the positioning stop wall, holes in the light strip are aligned with respective protrusions on a plurality of fixing structures along a direction of a length of the light strip.

15. A display device comprising:
a display panel; and
a backlight module according to claim 1.

16. A backlight module comprising:
a backplate; and
a light strip, wherein a fixing structure is provided on the backplate, the fixing structure comprising a resilient press tab including a hole thereon, and wherein the light strip includes a protrusion configured to engage the hole in the resilient press tab;

wherein the fixing structure further comprises a root portion connected to the backplate, wherein one end of the resilient press tab is connected to the root portion and the other end of the resilient press tab is a free end; and wherein the resilient press tab is parallel to the surface of the backplate, and wherein a height of a lower surface of the resilient press tab from an upper surface of the backplate is slightly larger than or equal to a thickness of the light strip.

* * * * *